Dec. 24, 1968  D. BOMAN ET AL  3,417,559
FRUIT AND NUT GATHERER
Filed July 19, 1965  9 Sheets-Sheet 9
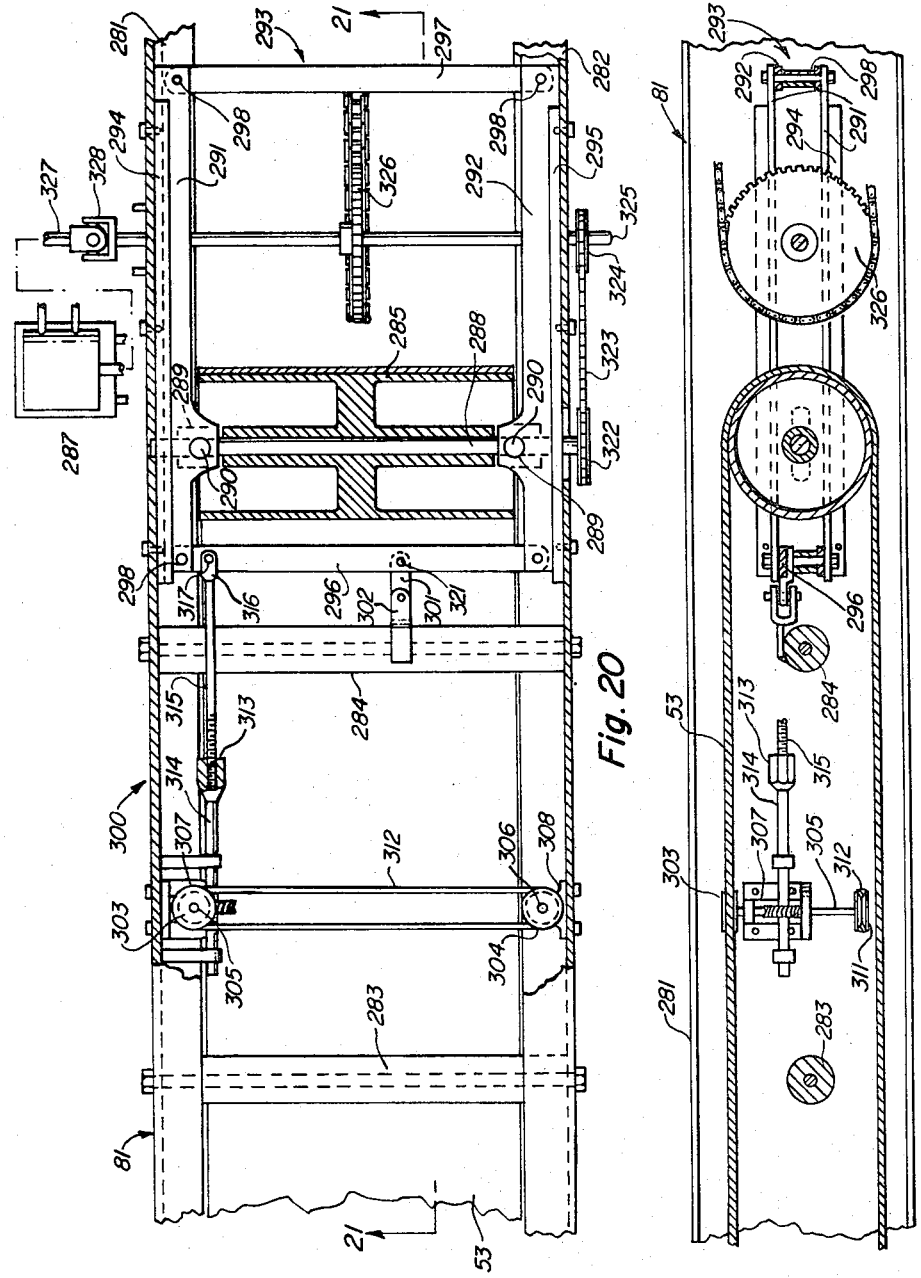
DONALD BOMAN
ELMER BOMAN
INVENTORS
BY
BUCKHORN, BLORE, KLARQUIST & SPARKMAN
ATTORNEYS United States Patent Office 3,417,559
Patented Dec. 24, 1968

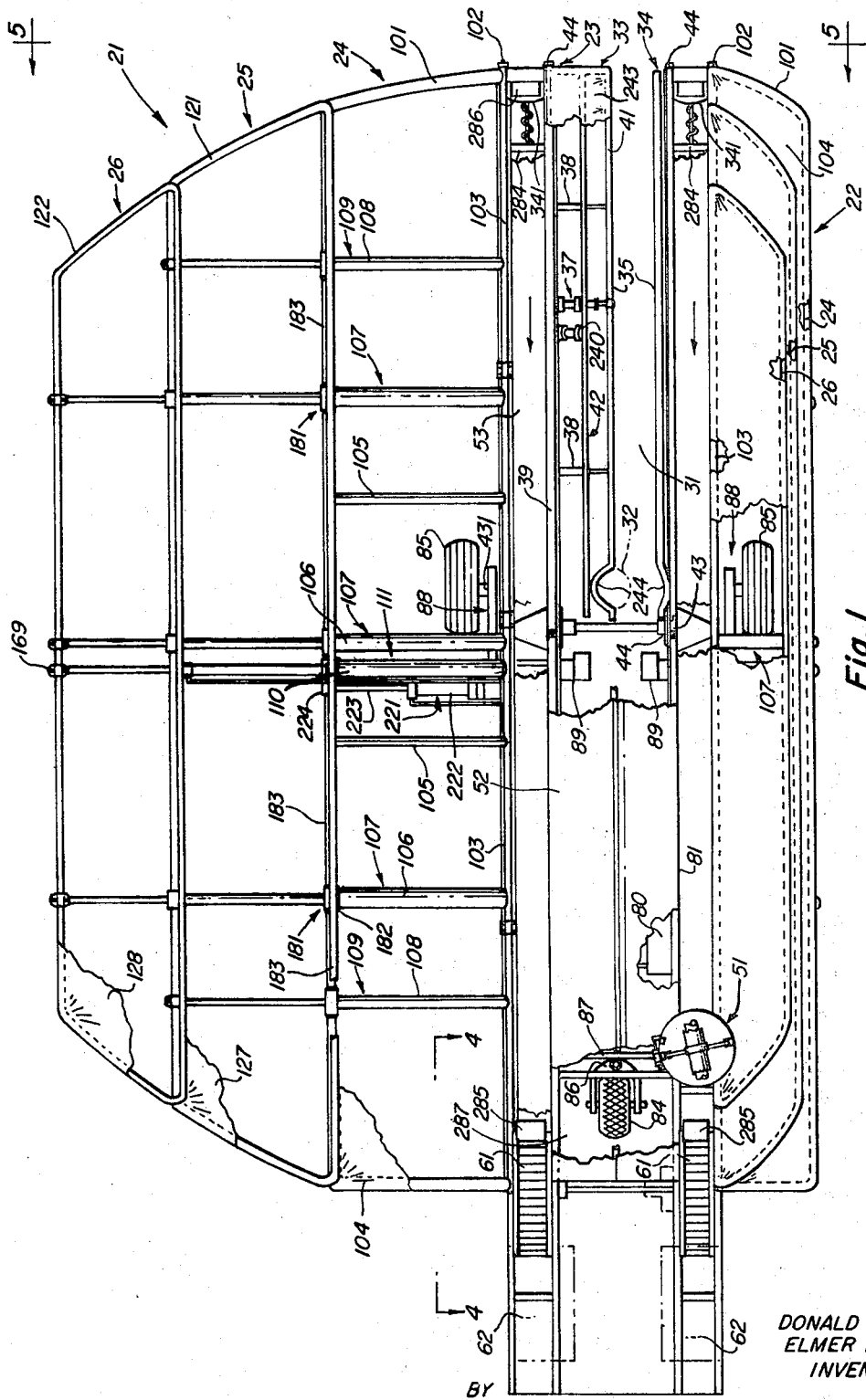

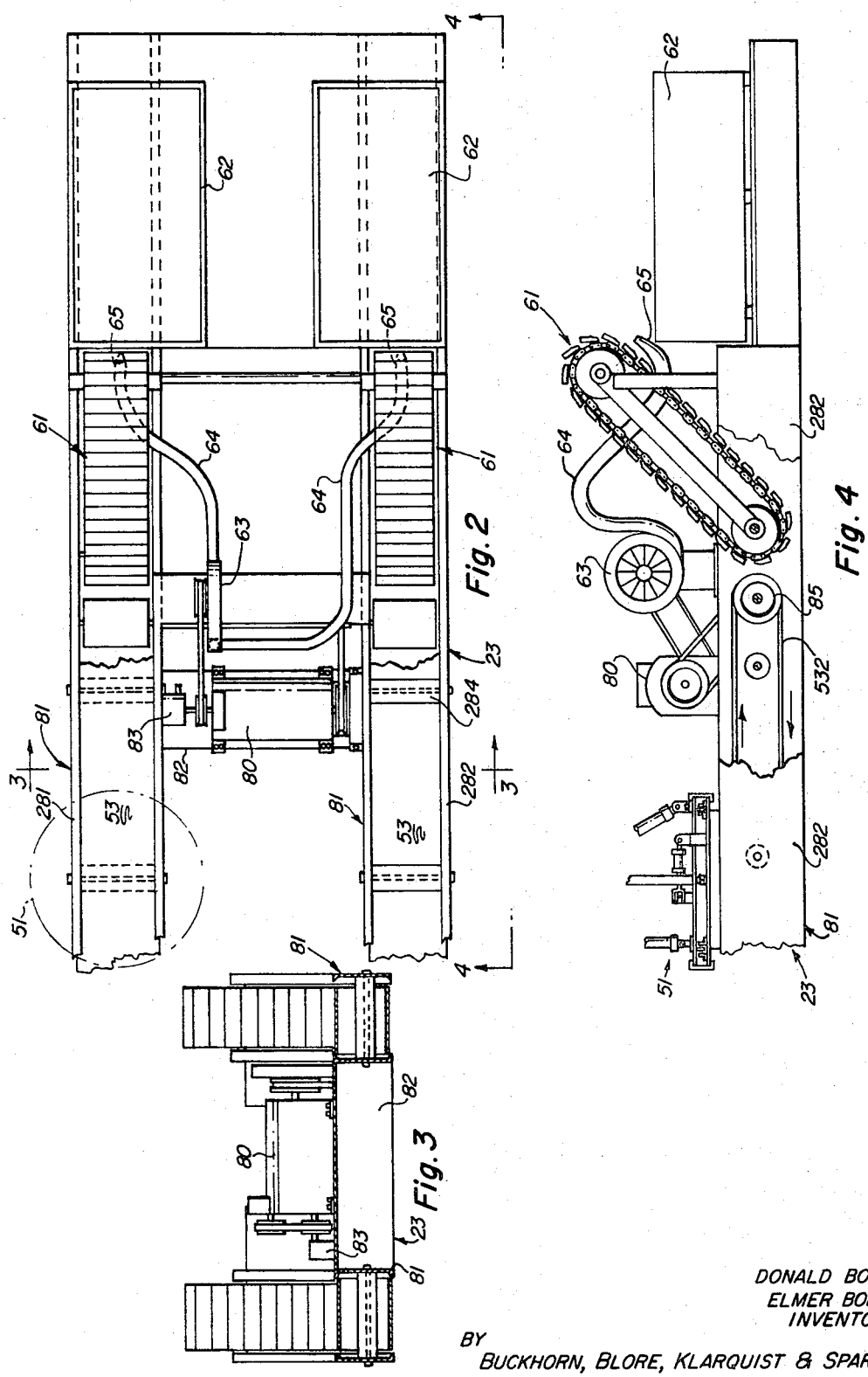

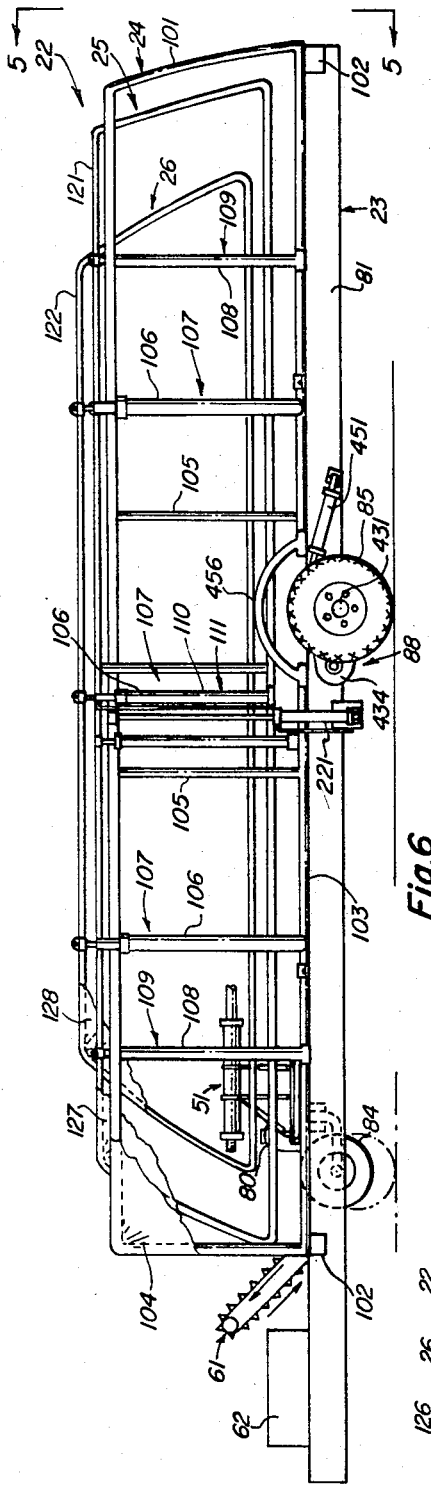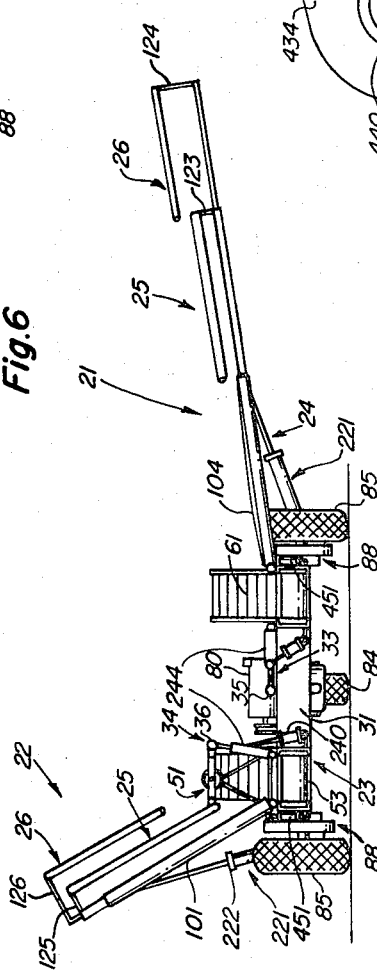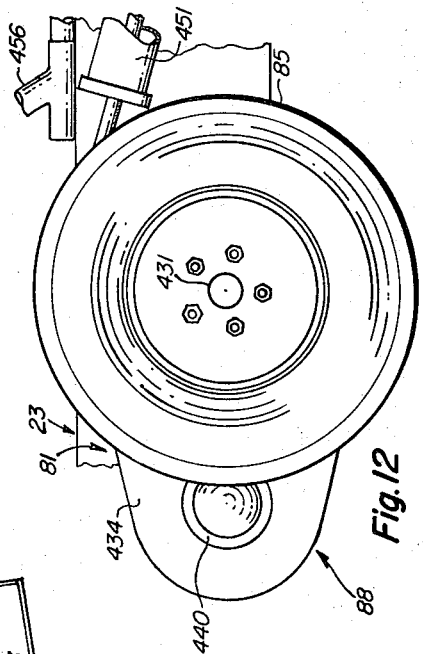

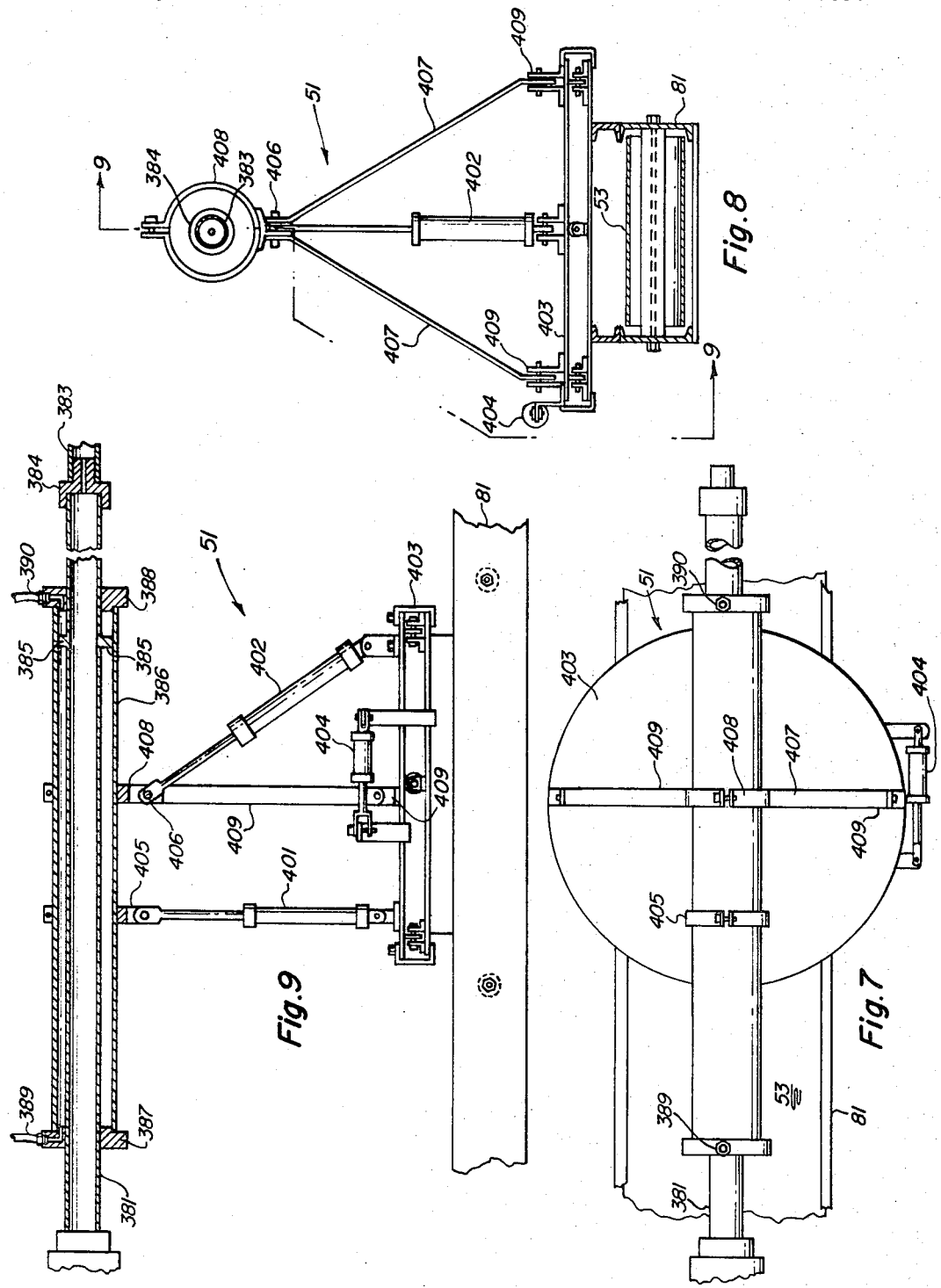

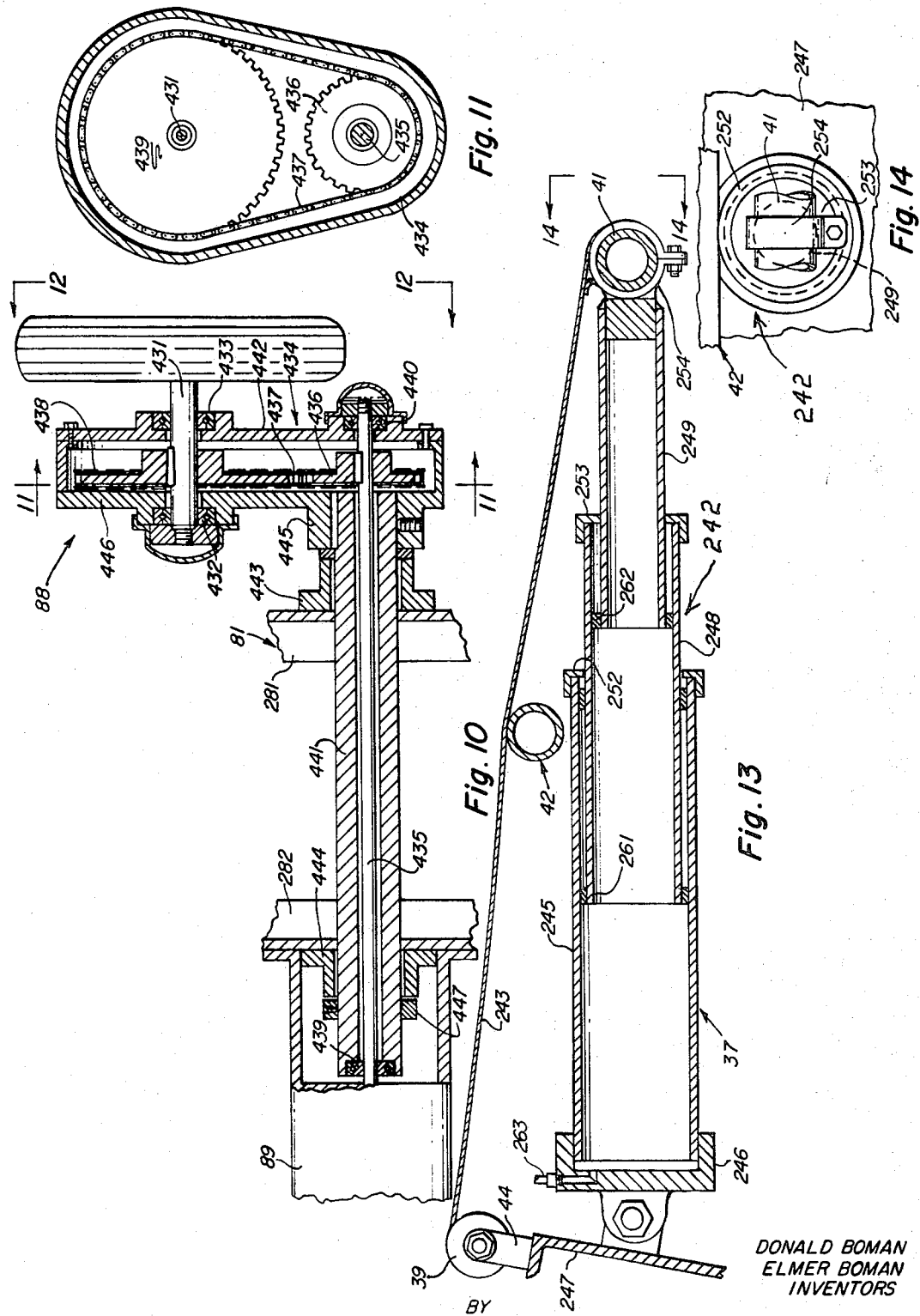

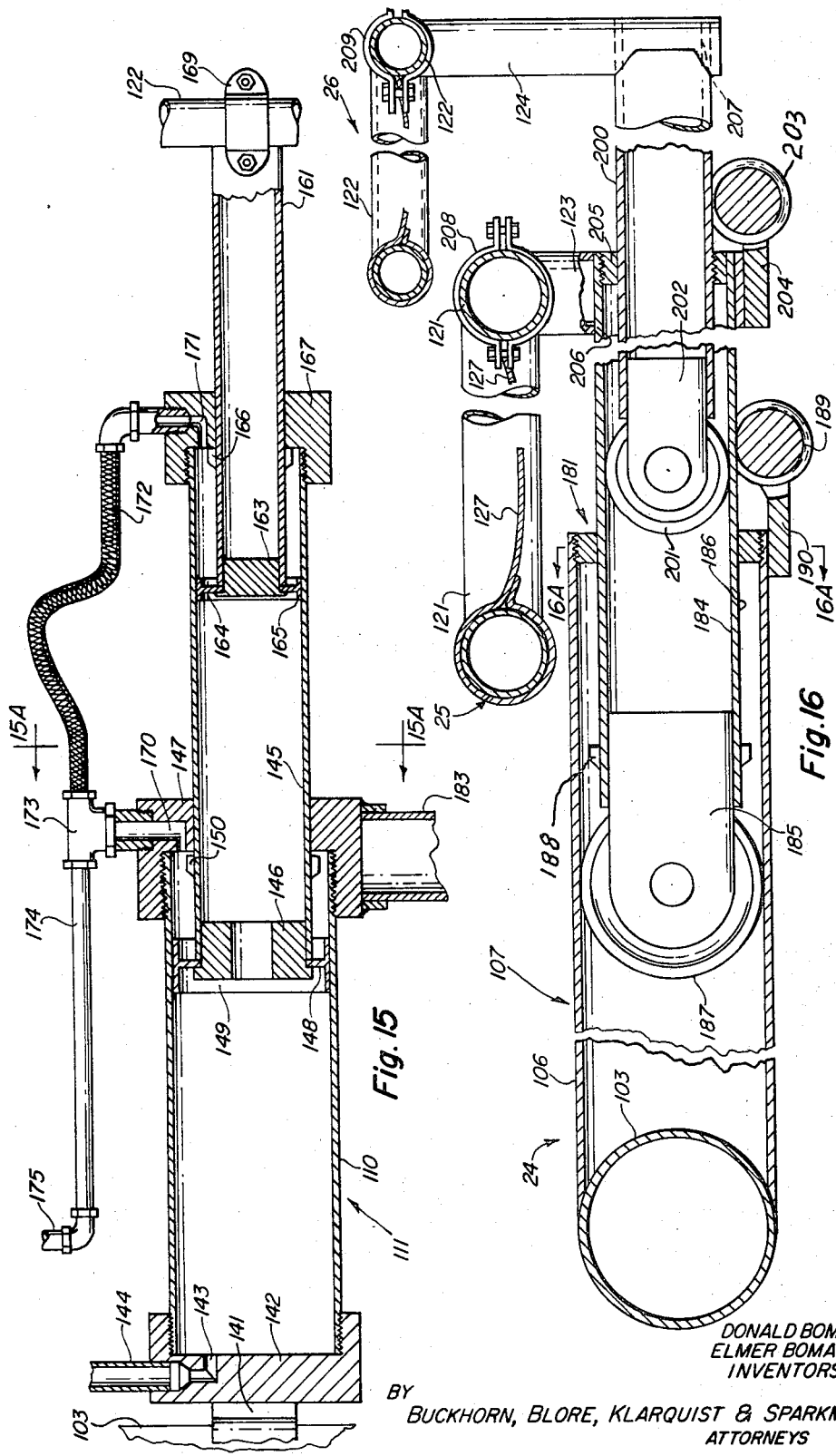

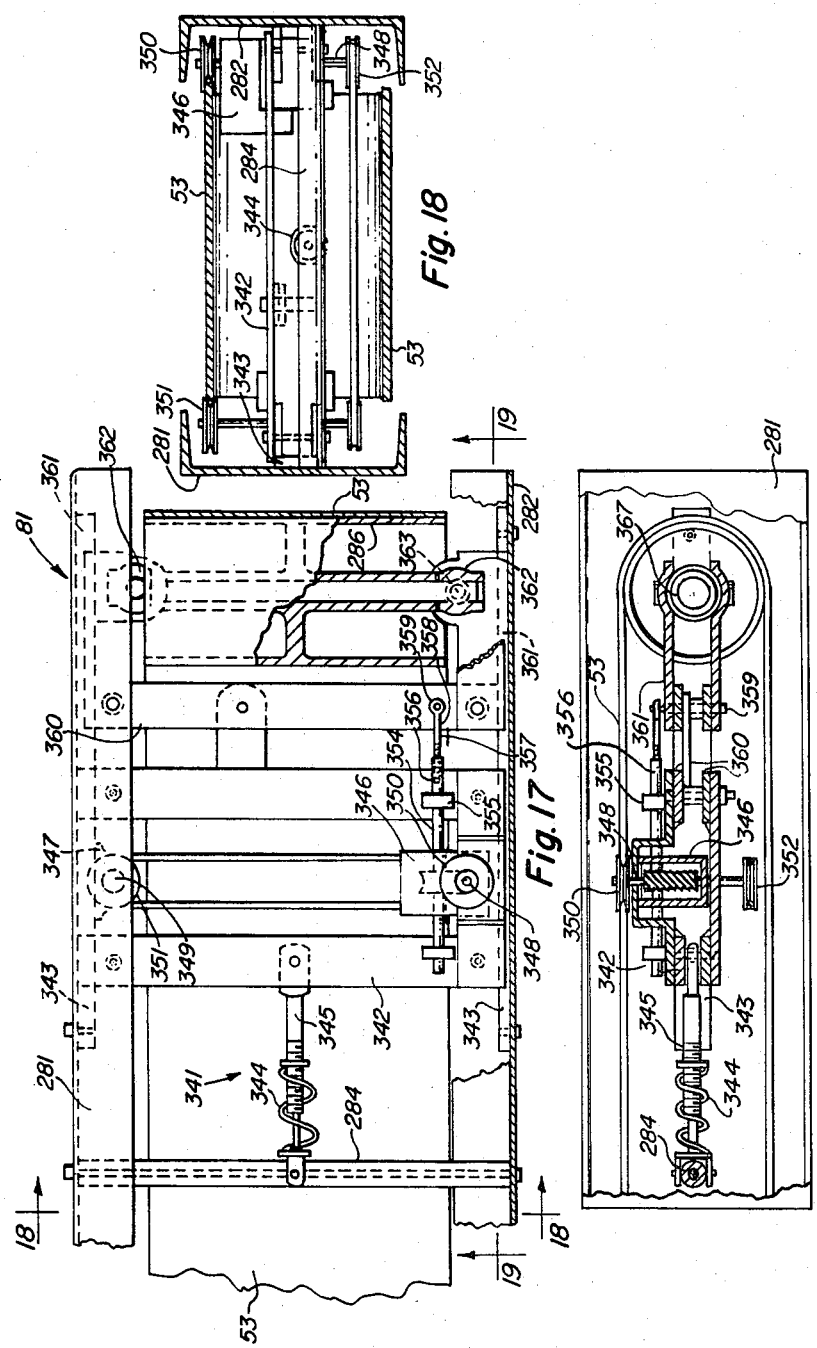

3,417,559
FRUIT AND NUT GATHERER
Donald Boman and Elmer Boman, both of
Dallas, Oreg. 97338
Filed July 19, 1965, Ser. No. 472,767
9 Claims. (Cl. 56—329)

ABSTRACT OF THE DISCLOSURE

A gatherer having folding wings having telescopic cylinders forming part of the frame is supported by wheels carried by arms pivoted to the frame for leveling the frame on sloping ground. The gatherer has a self-aligning delivery belt and a blower for removing debris and carries a shaker.

---

This invention relates to an improved fruit and nut gatherer, and more particularly to a highly maneuverable gatherer of large capacity.

There is shown in Boman Patent 2,692,470 a fruit and nut gatherer which is rugged, maneuverable and efficient. However, it would be desirable to provide a gatherer of this type which is more maneuverable, has a larger capacity, is more compact, is lighter in weight, and is lower than the gatherer disclosed and claimed in the above-mentioned patent. It would also be desirable to provide a gatherer of this general type which is quickly and easily leveled even where used on slopes and which separates leaves, twigs and other debris from the articles being gathered.

An object of the invention is to provide a new and improved fruit and nut gatherer.

Another object of the invention is to provide a highly maneuverable gatherer of large capacity.

A further object of the invention is to provide a fruit and nut gatherer which covers a large area when extended and is foldable and contractible into a very compact unit while being light in weight.

Another object of the invention is to provide a fruit and nut gatherer which can be easily leveled regardless of the slope of the ground supporting it.

A still further object of the invention is to provide a fruit and nut gatherer having folding, telescopic frames supporting gathering wings.

Yet another object of the invention is to provide a fruit and nut gatherer which automatically removes leaves, twigs and other debris from fruit and nuts gathered thereby.

A further object of the invention is to provide a fruit and nut gatherer having self-aligning delivery belt mounting devices.

The invention provides a fruit and nut gatherer having a frame supporting a plurality of telescopic wings extensible from contracted positions to extended positions. Preferably the frame is supported by three wheels with individually adjustable suspension devices connecting at least two of the wheels to the frame for leveling the frame regardless of the slope of the ground supporting the wheels. Preferably two of the wheels are driven by individually controlled motors to impart high maneuverability to the gatherer. In a fruit and nut gatherer forming a specific embodiment of the invention, a pair of extensible, outer wings each comprises a plurality of sections having telescopic guides parallel with pistons and cylinders serving to extend and contract the wing sections relative to one another. The wings are mounted on opposite sides of an elongated frame having a central slot extending from one end thereof to the central portion of the frame to permit the slot to be moved over the trunk of a tree to be shaken. A pair of inner wings are movable to positions covering the slot and, with the outer wings, deliver fruit and/or nuts, which are shaken from the tree by a shaker carried by the frame, to a pair of delivery belts mounted on self-aligning pulley devices. The belts drop the fruit and nuts onto elevators at the rear end of the frame, and blowers direct air through the fruit and nuts being dropped onto the elevators to remove debris therefrom. A prime mover mounted on the frame drives a hydraulic pump to provide a source of pressure for the cylinders of the wings and cylinders and hydraulic motors associated respectively with a pair of individual wheel suspensions and wheels supporting the frame through the wheel suspensions. The prime mover also supplies power to the blowers and the drive of the delivery belts.

A complete understanding of the invention may be obtained from the following detailed description of an improved fruit and nut gatherer forming a specific embodiment thereof, when read in conjunction with the appended drawings, in which:

FIG. 1 is a top plan view of an improved fruit and nut gatherer forming one embodiment of the invention;

FIG. 2 is an enlarged, fragmentary, top plan view of the gatherer of FIG. 1.

FIG. 3 is a sectional view taken along line 3—3 of FIG. 2;

FIG. 4 is an enlarged, fragmentary, side elevation view of the gatherer of FIG. 1;

FIG. 5 is an enlarged end view of the gatherer taken substantially along line 5—5 of FIG. 1;

FIG. 6 is an enlarged side elevation view of the gatherer of FIG. 1;

FIG. 7 is an enlarged, fragmentary top plan view of a shaker of the gatherer of FIG. 1;

FIG. 8 is an enlarged vertical sectional view of the shaker of FIG. 7;

FIG. 9 is an enlarged vertical sectional view taken along line 9—9 of FIG. 8;

FIG. 10 is an enlarged, horizontal sectional view of a wheel suspension of the gatherer of FIG. 1;

FIG. 11 is a vertical view taken along line 11—11 of FIG. 10;

FIG. 12 is a side elevation view taken along line 12—12 of FIG. 10;

FIG. 13 is an enlarged longitudinal sectional view of a telescopic cylinder device of a wing of the gatherer of FIG. 1;

FIG. 14 is an enlarged end view taken along line 14—14 of FIG. 13;

FIGS. 15 and 16 are enlarged longitudinal, sectional views respectively of a cylinder device for pivoting one of the outer wings and a cylinder device for extending one of the wings, FIG. 15 being taken substantially along line 15—15 of FIG. 15A;

FIG. 17 is an enlarged, fragmentary top plan view of a self-aligning pulley device of the gatherer of FIG. 1;

FIG. 18 is an enlarged, vertical sectional view taken along line 18—18 of FIG. 17 and turned 90°;

FIG. 19 is an enlarged, vertical sectional view taken along line 19—19 of FIG. 17;

FIG. 20 is an enlarged, fragmentary top plan view of a self-aligning pulley device of the gatherer of FIG. 1;

FIG. 21 is an enlarged, vertical sectional view taken along line 21—21 of FIG. 20.

Figure 15A:
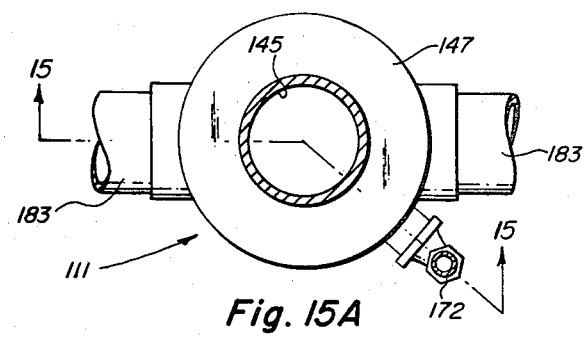
FIG. 15A is a sectional view taken substantially along line 15A—15A of FIG. 15.

Referring now in detail to the drawings, a fruit and nut gatherer shown therein and forming a specific embodiment of the invention includes a pair of identical but handed outer wings 21 and 22 (FIG. 1) which are individually foldable relative to a frame 23, and each includes an inner section 24, an intermediate section 25 and an outer or tip section 26. The frame has a slot 31 extending about one-half of the length thereof to permit the gatherer to be moved to a centered position under the branches of a tree with a trunk 32 of the tree positioned as shown in FIG. 1. After the gatherer is in a centered position under the tree, inner telescopic wings 33 and 34, which are carried hingedly by the frame, are moved to closed or operative positions sloping laterally downwardly from free edges 35 thereof, as illustrated by the wing 33 in FIG. 1, from open positions extending vertically, as illustrated by the wing 34 in FIG. 1. The wings 33 and 34 are extensible laterally as illustrated by the upper wing 33 which has a tube or rod 41 telescopically mounted relative to rod 42. The rods 41 and 42 are carried by guides 37 and cylinder devices 38 and a spring actuated takeup roller 39 is mounted on brackets 44 on the main frame 23. The inner wings then are moved down to overlapping, sloping positions closed on the lower portion of the trunk of the tree 32. The operator then folds down, if necessary, the outer wings 21 and 22 to sloping, upwardly facing positions and operates a known shaker 51 to shake the tree 32 and drop its fruit (or nuts) onto the canvases or close nettings of the wings, and the fruit rolls down the wings 21, 22, 33 and 34 and a sloping, ridged, rear, central portion 52 to endless belts 53. In FIG. 13, for convenience of illustration, the view is rotated clockwise from its actual position. Actually, the rod 41 is always higher than the rod 42 and the roller 39 so that fruit to be gathered falling on the wing rolls and slides to the left (and downwardly) as viewed in FIG. 13, to the adjacent conveyor belt 53.

The belts carry the fruit to elevators 61, and drop the fruit short distances onto the elevators, which carry the fruit up and drop it into boxes 62. As the fruit is dropped by the elevators toward the boxes, a blower 63 (FIGS. 2 and 4) having conduits 64 and nozzles 65 directs streams of air upwardly and to the rear, across the paths of the fruit, and blows away any debris being dropped by the elevators. Preferably the elevators 61 convey the fruit at a linear rate of speed about 25% faster than the linear speed of the conveyor belts 53 so as to easily pick up in spaced positions fruit massed together on the conveyor belts.

An engine 80 (FIG. 1) positioned between longitudinal members 81 of the main frame 23 by a frame 82 serves as the prime mover for the gatherer. The frame 82 is at the bottom of the members 81 to keep the top of the engine at a low level. The engine drives a hydraulic pump 83, which drives the driven elements of the gatherer through individual motors. The main frame is supported at a low level by a caster wheel 84 and two drive wheels 85. The wheel 84 is mounted by a caster mount 86 secured to cross members 87 forming a part of the main frame 23. The wheels 85 are mounted on individual, vertically adjustable, suspension units 88 and are driven by individually controllable hydraulic motors 89 carried by the main frame 23 in the space between the longitudinal members 81. The caster wheel is positioned at the rear of the engine 80 and the shaker 51, and the drive wheels are positioned outside the main frame 23 about one-half of the distance from the caster wheel 84 to the front end of the main frame. The wheels form a part of a three point suspension system to provide excellent stability. Since the drive wheels 85 are individually driven, high maneuverability is provided which aids greatly in gathering fruit and nuts from many orchards. Also, since the wheels 85 are individually adjustable vertically relative to the main frame, the main frame can be leveled or placed at any desired slope even in sloping terrain.

As is apparent from FIG. 1, the sections 24, 25 and 26 are tapered so that, when the wings 21 and 22 are moved to their slightly sloping and spread conditions in which the wing 21 is shown, the gatherer is generally circular. The gatherer, when extended, is of such a diameter as to extend beyond the outer periphery of the tree under which the gatherer is positioned. Each section 24 (FIGS. 1, 5 and 6) includes an endless, tubular, peripheral, frame 101 hinged to the outer and upper portion of the adjacent longitudinal member 81 by brackets 102 carrying aligned pintles which extend into ends of inwardly positioned tubular members 103. A canvas 104 covers the frame 101, which also includes crossbraces 105, cross tubes 106 rigid with the peripheral frame 101 and forming tubular guides of telescopic guide bars 107, tubular guide 108 of telescopic guide bars 109 and a cylinder 110 of an extending cylinder device 111 adapted to extend or spread the wing 21. Thus, the frames of the sections 24 are rigid, strong, and light in weight.

Figure 16A:
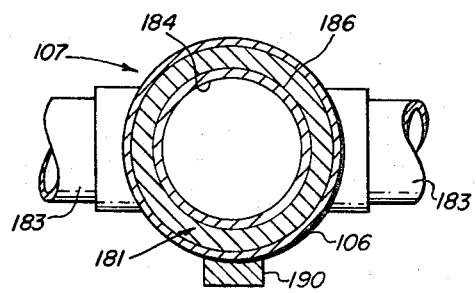
FIG. 16A is a sectional view taken substantially along line 16A—16A of FIG. 16.

The sections 25 and 26 comprise endless tubular frames 121 and 122, respectively, of progressively smaller diameter tubes, and the frames 121 and 122 are supported in overlapping or shingled relationship in cantilever fashion by posts 123 and 124 (FIG. 16), respectively, of the guide bars 107 and by posts 125 and 126 (FIG. 5), respectively, of the cylinder device 111. The sections 25 and 26 respectively have canvases 127 and 128 (FIG. 1) covering the entire frames 121 and 122 but being broken away in FIG. 1 to illustrate the construction of the frames 121 and 122.

The cylinder device 111 (FIGS. 1 and 15) is stepped and includes a connecting portion 141 secured to the tube 103 and a cylinder end 142 having a port 143 connected to a fluid line 144. A cylinder 145 having a flanged reinforcing sleeve 146 secured in the inner end thereof is slidable in ported cap 147 of the cylinder 111. An annular piston plate 148 is fixed rigidly to the sleeve 146, the cylinder 145 and a guide sleeve 149. A stop collar 150 is fixed to the cylinder 145 to limit movement of the cylinder 145 to the right, as viewed in FIG. 15, relative to the cylinder 110. A still smaller cylinder 161 is telescopic in the cylinder 145 and carries rigidly therewith a flanged plug 163, an annular piston plate 164, a guide sleeve 165 and a stop collar 166. The cylinder is slidable in ported cap 167 forming the end of cylinder 145. The posts 125 and 126 are rigidly mounted on the cap 167 and the outer end of the cylinder 161, respectively, and carry rigidly thereon split clamps 168 and 169 clamping the frames 121 and 122, respectively. To extend the cylinder device 111, the operator actuates a valve (not shown) to supply air under pressure from a compressor (not shown) driven by the engine or hydraulic liquid under pressure from the pump 83 to the conduit 144 into the lefthand end of the cylinder 110, as viewed in FIG. 15, and exhaust the annular spaces immediately to the right of the annular piston plates 148 and 164 through ports 170 and 171, flexible conduit 172, T-coupling 173, conduit 174 and flexible conduit 175 leading to the valve. This extends the cylinders 145 and 161 to spread or extend the sections 25 and 26 to their fully extended positions, the stops 150 and 166 serving to prevent overextension of the sections 25 and 26. To contract the sections 24 and 25, the operator actuates the known control valve to exhaust through conduit 144 and supply air or hydraulic liquid under pressure through the conduit 175 to drive the cylinders 145 and 161 to the left by pressure on the annular piston plates 148 and 164, respectively.

The telescopic guide bars 107 (FIGS. 1, 6 and 16) guide the sections 25 and 26 as they are extended or contracted by the cylinder devices 111. Each guide bar 107 includes the tube or cylinder 106, which is fixed rigidly to the tube 103 and to a coupling 181 having socket ends 182 receiving and secured rigidly to end portions of tubes 183 of the frame 101. A smaller tube 184 having a forked end 185 is slidable through bore 186 in the coupling 181 and the forked end 185 carries an antifriction roller 187 having a spherical periphery and adapted to roll freely in the tube 106. A stop collar 188

(FIG. 16) on the tube limits extension of the tube 184 relative to the tube 106. A grooved roller 189 supported by forked bracket 190 fixed to the outer end portion of tube 106 acts to support the tube 184 with minimum friction. The rollers 187 and 189 are the only closely engaging elements between the tubes 106 and 184 so that there is little frictional resistance to travel of the tube 184 relative to the tube 106. Similarly, end tube 200 is mounted, with low friction, telescopically relative to the tube 184 by a roller 201 carried by forked bracket 202 fixed to the inner end portion of the tube 200 and a grooved roller 203 carried by forked bracket 204 fixed to the underside of the outer end of the tube 184. A bushing 205 loosely guides the tube 200. The posts 123 and 124 have bores 206 and 207, respectively, and are fixed rigidly to the outer end portions of the tubes 184 and 200. Upper ends of the posts 123 and 124 rigidly carry split clamps 208 and 209, respectively, which are clamped rigidly to the outer portions of the frames 121 and 122, respectively.

Cylinder devices 221 (FIGS. 1 and 5) having double acting cylinders 222 and piston rods 223 and secured pivotally at the outer ends to outer ends 183 of the frames 101 are controlled by valves (not shown) to pivot the wings 21 and 22 individually to any desired position relative to the frame 23, from a substantially upright traveling position as illustrated by the wing 22 in FIG. 5 to a substantially horizontal operative or unfolded position as illustrated by the wing 21 in FIG. 5. The piston rods 223 are pivotally secured to the tubes 183 by T-couplings 224 fixed to the ends of the piston rods and through which the tubes 183 rotatably extend.

The inner wings 33 and 34 (FIGS. 1, 5, 13 and 14) are pivotal by a double-acting cylinder device 240 between substantially vertical travelling positions opening the slot 31 and slightly inclined, overlapping, closed operative or working positions. The wings 33 and 34 also are laterally extensible and each includes the rod 41 and frame 42, the former being telescopically mounted on the latter by the telescopic guides 37 and an extending cylinder device 242, springs (not shown) being provided for contracting the cylinder device 242. Covering canvases 243, each secured at one edge to the rod 41 and at the other edge to the spring driven takeup rolls 39, cover the tops of the rods and the frames and are stretched reasonably taut when the rods 41 are in their extended positions. FIG. 13 has been turned clockwise somewhat for space consideration, the canvas 243 actually sloping downwardly and to the left. The sections 33 and 34 slope downwardly toward and extend slightly over the conveyor belts 53. The rods 35 have generally semicircular portions 244 (FIG. 1) adapted to provide clearance for the trunk of the tree 32 when the sections 33 and 34 are moved to their closed positions covering the slot 31. The cylinder device 242 includes a cylinder 245 having an end cap 246 provided with a shoe 247 rigidly secured to the inner side of the frame 42. Progressively smaller, telescoped cylinders 248 and 249 (FIGS. 13) are slidable along the cylinder 245 and are provided with annular pistons 261 and 262, respectively, caps 252 and 253 and a plug connector 254 closing the righthand ends of these cylinders. Pistons 261 and 262 are fixed to the inner end portions of the cylinders 248 and 249, and conduits 263, 264 and 265 supply and exhaust fluid under pressure to the cylinder device under the control of a valve (not shown) actuated by the operator.

Each longitudinal member 81 (FIGS. 1 and 17 to 21) is a rigid frame including a pair of facing channels 281 and 282 secured rigidly together by crossbraces 283 and tie rods 284. The longitudinal members are tied together rigidly by the transverse members located to the left of the slot 31, as viewed in FIG. 1. Self-aligning drive pulleys 285 and guide pulleys 286 support and guide the endless conveyor belts 53. One of the drive pulleys is driven by a hydraulic motor 287 (FIGS. 1 and 20), which is driven by the hydraulic pump 83 and drivingly coupled to a drive shaft 288 to which the pulley 285 is keyed. The motor is carried by the shaft and rests on and is slidable on a plate 279 carried by the channel 281. The shaft 288 is journaled by bearings 289 carried pivotally by pins 290. The pins 290 are carried in vertical, parallel positions by parallel side frame members 291 and 292 of a parallelogram linkage 293. The members 291 and 292 are slidable along pairs of oppositely facing guide rails 294 and 295 carried by the channels 281 and 282. Parallel transverse members 296 and 297 are pivotally connected to the members 291 and 292 by pins 298 to form the parallelogram linkage 293.

A belt-aligning device 300 includes a link 301 (FIGS. 20 and 21) pivotally connecting the member 296 to a bracket 302 fixed to one of the tie rods 284. A pair of grooved pulleys 303 and 304 carried respectively by shafts 305 and 306 of a worm gear reducer 307 and a bearing 308 are mounted on the channels 281 and 282. Lower pulleys 311 on the shafts 305 and 306 and coupled by a belt 312 drivingly couple the pulley 304 to the worm gear reducer 307. The upper course of the belt 53 normally travels loosely between the pulleys 303 and 304. However, if there is some misalignment of the pulley 285, one edge of the belt 53 will engage one of the pulleys 303 and 304 and drive that pulley to drive the worm gear reducer 307 in a direction correcting the misalignment. The worm gear reducer drives an elongated nut 313 keyed to output shaft 314 of the gear reducer and the nut 313 rotates on a threaded end of rod 315 pivotally connected by forked end 316 thereof and pin 317 to the member 296. This pivots the member 296 on pin 321 connected to the link 301 to slide the members 291 and 292 to correctly align the drive pulley 285, after which the belt 53 no longer drives the pulley 303 or 304.

The shaft 288 (FIG. 20) drives a sprocket 322, chain 323 and sprocket 324 to drive shaft 325. The shaft 325 drives sprocket 326 to drive the adjacent bucket elevator conveyor 61, and also drives a shaft 327 through a universal joint 328. The shaft 327 drives a sprocket (not shown) driving the other bucket elevator conveyor 61 and also drives through sprockets, chain and shaft (not shown) corresponding to the sprockets 322 and 324 and chain 323 and shaft 288, respectively, to drive the other drive pulley 285 (not shown) which is aligned properly by a belt-aligning device substantially identical to the belt-aligning device 300.

The pulleys 286 (FIGS. 1, 17, 18 and 19) are mounted individually by identical belt tightening and aligning devices 341. Each device 341 includes a rigid frame 342 urged along guides 343 by a compression spring 344 tending to extend a telescopic link 345 secured to tie rod 284 and to the frame 342. The frame 342 carries a worm gear reducer 346 and a bearing 347 carrying shafts 348 and 349 to which are keyed grooved pulleys 350 and 351 between which the upper course of the belt 53 travels loosely. When the belt 53 is properly coursing, neither pulley 350 nor pulley 351 is driven by the belt and the pulley 386 is not adjusted. When the belt moves into driving engagement with the pulley 350 or the pulley 351, the worm gear reducer 346 is driven in an aligning direction, the pulley 350 being coupled to the shaft 348 by pulleys 352 and a belt 353. The reducer 346 drives output shaft 354 journaled by bearing 355 on the frame 342 to rotate nut portion 356 relative to threaded end portion 357 of rod 358 secured pivotally by pin 359 to lever member 360 pivotally connected to arms 361. The arms 361 are slidable along the guides 343 and carry self-aligning bearings 362 journaling the pulley 286 and secured to the arms 361 by parallel, vertical pins 363. The lever 360 is pivoted to precisely align, for proper tracking or coursing of the belt, the pulley 286, the axis of rotation of which is always parallel to the lever 360.

The shaker 51 (FIGS. 1 and 5 to 9) includes an elongated tubular arm 381 carrying known limb gripping fingers (not shown) which are opened and closed pneumatically under the control of the operator by a conduit 383 connected to one end of the tubular arm by coupling 384 and at the other end to a valve (not shown) controlled by the operator and connected to a supply of compressed air carried by the gatherer and maintained under pressure by a compressor (not shown) driven by the engine 80. An annular piston plate 385 is fixed to the arm 381 in a cylinder 386 between ported cylinder ends 387 and 388, which are connected by conduits 389 and 390 to ports of a known valve device (not shown) actuable by the operator and connected to a source of fluid under pressure carried by the gatherer, the last-mentioned valve device being preferably of a known type, which may be actuated to rapidly reverse pressures to the ends of the cylinder 386 to reciprocate the arm 381 to shake a limb gripped by the fingers and also may be actuated by the operator to move the arm 381 along the cylinder 386 to extend the arm or contract the arm relative to the cylinder. The cylinder 386 is mounted for tilting by extensible cylinder devices 401 and 402. The devices 401 and 402 are mounted pivotally on a generally horizontal turntable 403 rotatably mounted on the member 81 and rotatable by a cylinder device 404. The upper end of the cylinder device 401 is pivotally connected to a split clamp 405 secured to the cylinder 386, and the upper end of the cylinder device 402 is connected pivotally by pin 406 to the upper ends of angular arms 407 and to split clamp 408, the lower ends of the arms 407 being mounted pivotally to brackets 409 fixed to the turntable. The arm 381 thus is mounted for limited universal movement relative to the frame or chassis of the gatherer so as to conveniently grip any limb which is to be shaken.

The three point suspension structure of the gatherer is illustrated in FIGS. 1, 5, 6, 10 and 11. The wheels 85 are mounted on and keyed to axles 431 mounted rotatably in pairs of aligned, radial-and-thrust bearings 432 and 433 carried by split housings 434. Each wheel 85 is driven individually and selectively in either direction, under the selective control of the operator, by the associated hydraulic motor 89 through a drive shaft 435, a sprocket 436 keyed to the shaft 435, a chain 437, a sprocket 438 keyed to the axle 431 and the axle 431. The shaft 435 is journaled in radial-and-thrust bearings 439 and 440 carried respectively by sleeve 441 and cover 442 of the split housing 434. The sleeve 441 is mounted rotatably in bearings 443 and 444 carried by the channels 281 and 282, respectively. A hub 445 of a cup-shaped housing member 446 is fixed to the sleeve 441 and, with a collar 447, limits endwise movement of the sleeve 441. The sleeve 441 and housing 434 mount the wheel 85 on the frame 23 for limited revolving movement about the generally horizontal axis of the sleeve 441. An extensible cylinder device 451 (FIG. 6) is connected pivotally at one end to longitudinal member 81 of the frame 23 and pivotally at the other end thereof to the outer or free end of the housing 434. Hydraulic liquid is supplied under pressure to and is exhausted from the cylinder device 451 under the selective control of the operator to pivot the housing 434 to raise or lower the frame relative to the wheel 85. Each of the cylinder devices 451 of the two suspension units 88 may be actuated individually under the selective control of the operator. This permits leveling of the frame 23 and the wings carried thereby. Curved portions 456 (FIG. 6) of the frames 101 provide clearance for the wheels 85 when the frame 23 is lowered relative to the wheels 85. Since the wheels 85 are selectively drivable in either or no direction, the gatherer may be turned in a very short radius circle and otherwise maneuvered as desired.

The above-described gatherer is highly maneuverable, may be leveled as desired, and has a very low profile or silhouette to aid in getting under trees and for vision of the operator in positioning the gatherer and observing its operation. The wings 21 and 22 are extended and contracted without binding by the rugged, lightweight and compact construction thereof. Leaves, twigs and other debris are removed from the articles gathered by the blowers 64, and the pulleys 285 and 286 mounting the conveyor belts automatically are positioned for proper tracking of the belts 53 and also are urged apart relative to one another to maintain desired tautness of the conveyor belts.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a fruit and nut gatherer:
a first planar frame,
a second planar frame,
a cylinder mounted in the first planar frame,
a piston rod telescopic in the cylinder,
means mounting the second planar frame on the piston rod in extensible overlapping relationship to the first planar frame,
and gathering sheet means carried by the frames,
the cylinder being rigidly attached to and forming a part of the first planar frame.

2. In a fruit and nut gatherer:
a planar, endless tubular first frame,
a cylinder of a predetermined inner diameter and extending in the plane of the first frame and having a closed end secured to one side of the first frame and an open end secured to the other side of the first frame,
a tube of a substantially lesser diameter than the inner diameter of the cylinder slidable in the cylinder and having an outer end located beyond the open end of the cylinder,
a piston secured to the inner end of the tube and fitting closely in the cylinder,
an annular member slidably mounting the tube and closing the outer end of the cylinder,
means for selectively supplying fluid under pressure to the opposite ends of the cylinder,
a second frame,
means mounting the second frame on the outer end of the tube in extensible, overlapping relationship to the first frame,
and cover means on the frames.

3. In a fruit and nut gatherer:
a series of tubes of progressively smaller diameter telescopic one within another with the outer diameter of each of smaller tubes being substantially less than the inner diameter of the next larger tube,
a plurality of annular piston means on the smaller ones of the tubes fitting closely and slidably in the next larger tubes,
a plurality of annular cylinder end members on each larger tube and fitting closely on the next smaller tube,
a plurality of covered frames,
means mounting the frames in stepped relationship on the outer ends of the tubes for extensible and contractible movement by the tubes,
and means for supplying fluid under pressure selectively to the largest tube and to the portion of each tube between the piston means and the cylinder end members.

4. In a fruit and nut gatherer:
a main frame including a pair of beam members and means securing the beam members together in parallel positions along one end portion of each with the other end portions of the beam members defining a slot permitting receipt of a tree trunk between said other end portions of the beam members,
mobile means carrying the frame, each beam member comprising a pair of elongated, rigid elements spaced from each other,
a pair of endless conveyor belts,
pulley means mounting the belts between the elongated, rigid elements,
self-aligning means carrying the pulley means,
and gathering wing means carried by the elongated, rigid elements for supplying fruit and nuts to the belts.

5. The fruit and nut gatherer of claim 4 wherein each self-aligning means comprises:
carrier means mounted pivotally on one of the beam members and carrying one of the pulleys,
a pair of sensing pulleys engaging opposite sides of the conveyor belt coursing on the last mentioned pulley,
reversible drive means driven by either sensing pulley,
and means driven by the drive means for pivoting the carrier means.

6. The fruit and nut gatherer of claim 5 including a first shaft mounting and driven by one of the sensing pulleys:
a second shaft mounting and driven by the other sensing pulley,
belt and pulley means coupling the shafts together,
reversible screw means connected to the carrier means,
and reversible gear means coupling one of the shafts to the reversible screw means.

7. In a fruit and nut gatherer:
an elongated main frame,
wing means carried by the main frame,
caster wheel means supporting the rear end of the frame,
a pair of wheels,
a pair of individual suspension means connecting the central portion of the frame to the pair of wheels and defining a three-point suspension system for the frame,
each suspension means including arm means pivoted at one end to the frame on a first axis and pivoted at the other end thereof on a second axis parallel to the first axis,
drive shaft means extending along the first axis and carried by the frame,
axle means keyed to one of the wheels and journaled in the arm means on the second axis,
and means drivingly coupling the drive shaft means to the axle means.

8. The fruit and nut gatherer of claim 7 including a tubular member journaling the drive shaft and carried by the frame:
motor means coupled to the drive shaft and carried by the frame,
the arm means comprising a hollow casing carried by the tubular member and bearing means carried by the casing and journaling the axle means,
and a fluid pressure cylinder device operable under the control of an operator to swing the arm means upwardly and downwardly relative to the frame.

9. A fruit and nut gatherer,
a main frame including a pair of elongated, parallel members,
a drive pulley mounted on the frame pivotally between the members,
an endless belt on the drive pulley,
wing means on the frame for delivering fruit and nuts to the belt,
sensing means on the frame responsive to the position of the belt,
means on the frame responsive to the sensing means for pivoting the drive pulley to align the belt,
an idler pulley engaging the belt,
carrier means slidable along the frame,
pivotal means on the carrier means mounting the idler pulley,
second sensing means carried by the carrier,
means on the carrier means responsive to the second sensing means for pivoting the pivotal means to pivot the idler pulley,
and means on the frame for urging the carrier means in a belt-tightening direction.

References Cited

UNITED STATES PATENTS

| | | | |
|---|---|---|---|
| 1,962,668 | 6/1934 | Olney. | |
| 2,692,470 | 10/1954 | Boman | 56—328 |
| 2,780,904 | 2/1957 | Bowie et al. | 56—328 |
| 2,913,866 | 11/1959 | Curtis | 56—329 |
| 3,145,521 | 8/1964 | Herbst | 56—329 |

RUSSELL R. KINSEY, *Primary Examiner.*